July 7, 1964   H. FLEISSNER ETAL   3,140,157
DRYING APPARATUS
Filed March 24, 1960   6 Sheets-Sheet 1
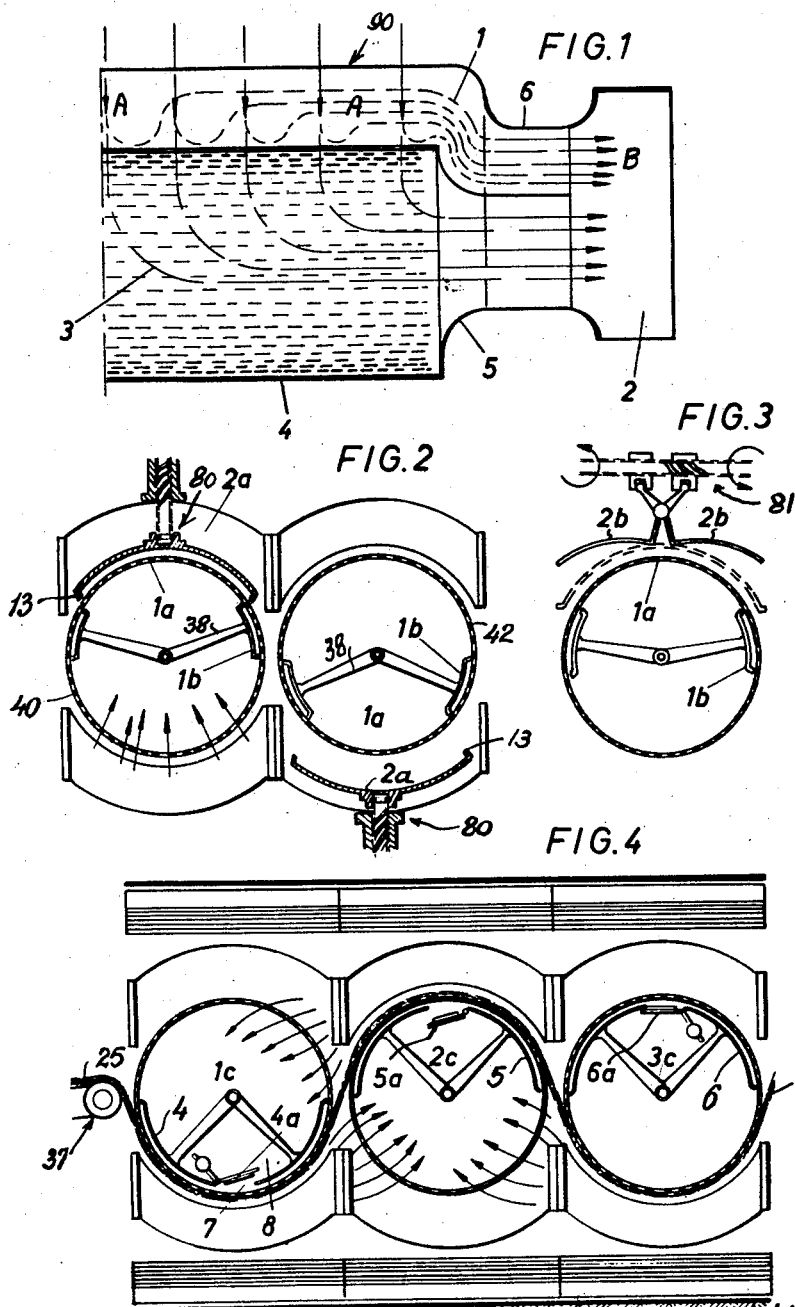
INVENTORS:
HANS FLEISSNER
GEROLD FLEISSNER

INVENTORS:
HANS FLEISSNER
GEROLD FLEISSNER

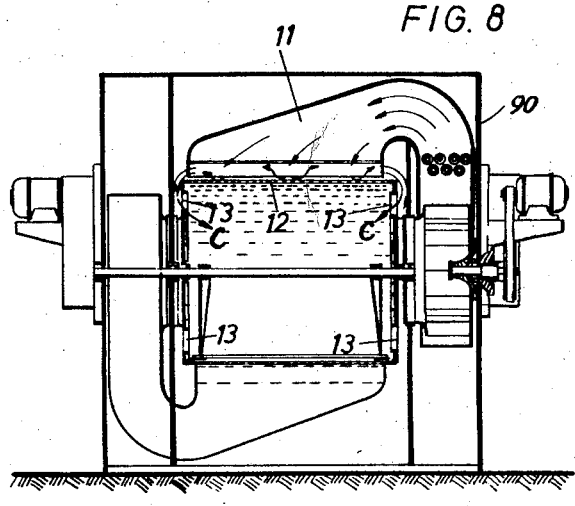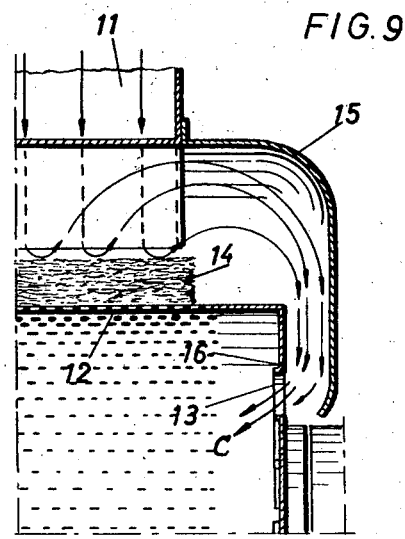

July 7, 1964  H. FLEISSNER ETAL  3,140,157
DRYING APPARATUS
Filed March 24, 1960  6 Sheets-Sheet 4

INVENTORS:
HANS FLEISSNER
GEROLD FLEISSNER

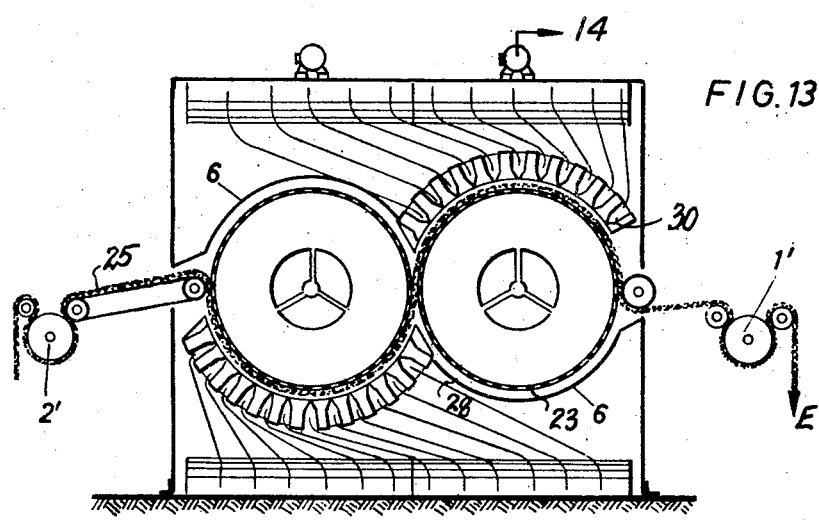
FIG. 13
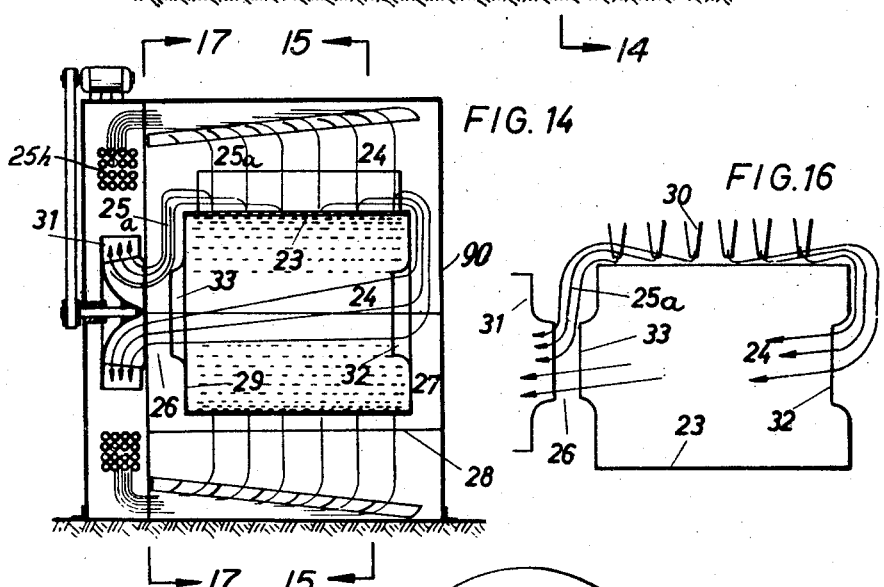
FIG. 14
FIG. 16
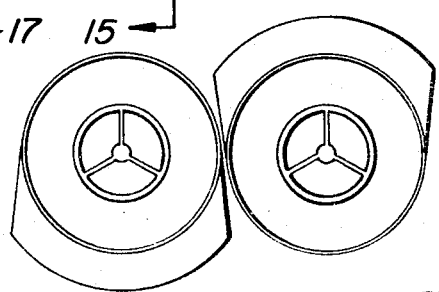
FIG. 15
INVENTORS:
HANS FLEISSNER
GEROLD FLEISSNER

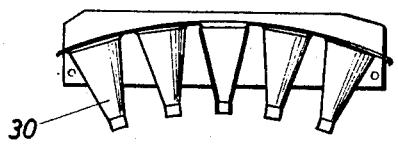
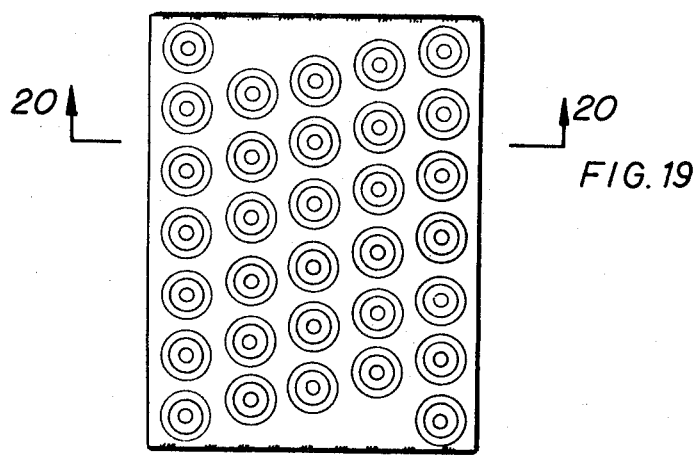
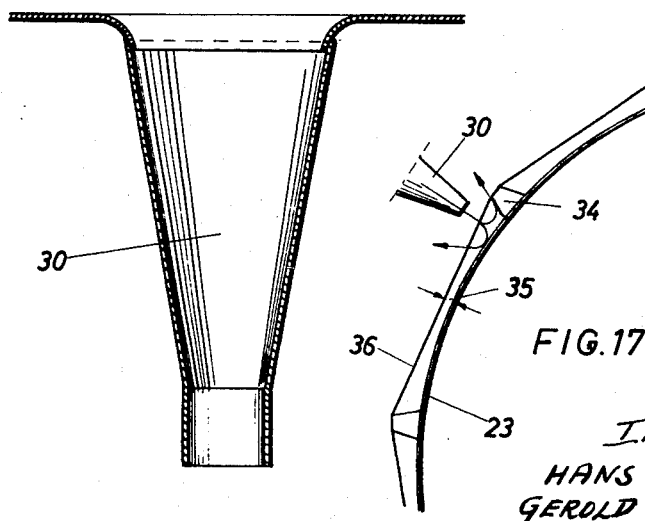

United States Patent Office 3,140,157
Patented July 7, 1964

3,140,157
DRYING APPARATUS
Hans Fleissner and Gerold Fleissner, Egelsbach, near Frankfurt am Main, Germany, assignors to Firma Fleissner GmbH, Egelsbach, Frankfurt am Main, Germany
Filed Mar. 24, 1960, Ser. No. 17,397
Claims priority, application Germany Mar. 26, 1959
5 Claims. (Cl. 34—115)

This invention relates to drying apparatus and is particularly concerned with the air flow in drum driers of the kind, wherein a web of material to be dried is supported on the circumference of and advanced by one or several rotatable sieve drums, while drying air is blown against the web.

In driers of this kind the air is usually directed against the material to be dried with great force and velocity in order to overcome the surface tension of the water and steam contained in the material.

In addition to facilitating the drying process, the air impinging on the material serves two further purposes, to wit, it urges the web material toward the drum surface and it partakes in the advance of the web through the drier. With a view to accomplishing the two latter functions, it is ordinarily necessary to evacuate the air within the drum interior.

Known drum driers have several serious drawbacks. Usually they are either designed for drying air-permeable materials or for materials which are not or only slightly permeable to air. Further, the known driers are not very efficient, as they require large air volumes and a long period of time for obtaining the desired degree of dryness.

Another important disadvantage of present day drum drier constructions is that the air flow within the drier is uneven and poorly utilized and distributed resulting in a spotty and uneven drying effect. In other words, the surface of the web subjected to the impact force of the entering air, usually is dried more effectively than the web surface facing the drum.

For the purpose of this specification and the appended claims, the expression "web" is deemed to mean webs proper, as well as fleeces, fiber and thread groupings and other formations including piece goods, sufficiently coherent and flexible so as to be able to be advanced over a drum.

It is an object of this invention to overcome the drawbacks of known drum driers and to provide for a sieve drum drier construction which may be used for both air-permeable web materials and materials which are not or but slightly permeable to air. Thus, the inventive drier construction may successfully be used for the drying of wood veneer, all kinds of fabrics, weaves and fiber material, fiber fleeces, cellulose and the like.

A further object of this invention is the provision of a sieve drum drier of unsurpassed efficiency in which the desired degree of dryness is attained with exceedingly small amounts of air in a minimum of time.

Still a further object of this invention is the provision of a sieve drum drier, wherein the material to be dried is subjected to an even drying action resulting in uniform drying throughout the material.

It is also an object of this invention to provide a sieve drum drier which is of simple and rugged construction, and inexpensive to build.

Finally, it is an object of the invention to provide means conducive to marked improvements of sieve drum driers which may be operated with any suitable fluid or fluids, such as air, superheated steam, inert gas or gases and the like to bring about a highly economical and speedy treatment of even delicate fabrics, tissue materials etc.

These and other objects and advantages of the invention will become apparent from the following detailed description particularly when read in conjunction with the accompanying drawings, wherein:

FIG. 1 is a schematic representation of the air flow in one embodiment of the inventive drying arrangement;

FIGS. 2–5 illustrate schematically various embodiments of air pressure control means cooperating with the drum walls for adjusting the pressure difference between the interior of the drums and the surrounding space;

FIG. 8 is a schematic representation of a further embodiment of an inventive sieve drum drier;

FIG. 9 is a fragmentary sectional view of FIG. 8 supplemented by air deflecting means;

FIG. 13 shows a further embodiment of a sieve drum drier;

FIG. 14 is a section along line 14—14 of FIG. 13;

FIG. 15 is a fragmentary section taken on line 15—15 of FIG. 14;

FIG. 16 is a detail view of FIG. 14;

FIG. 17 is a fragmentary section taken on line 17—17 of FIG. 14; and

FIGS. 18, 19 and 20 illustrate various views of the nozzle arrangement.

Figure 5:
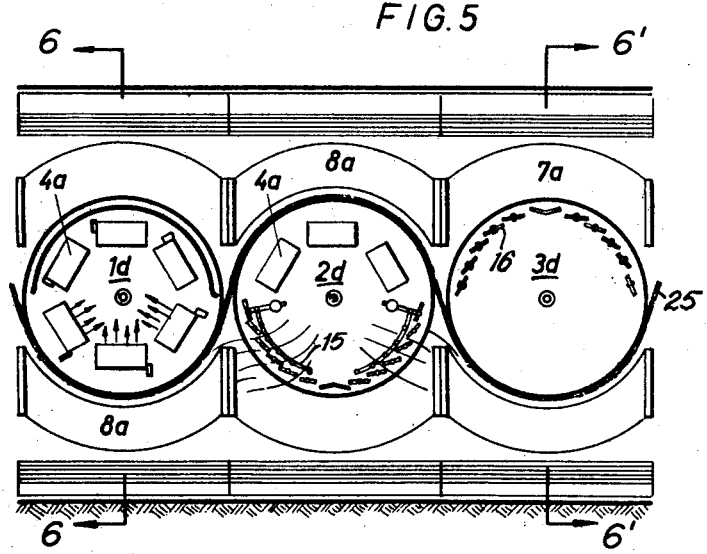

Briefly, and in accordance with this invention, a sieve drum drier is constructed in such a manner that the air flow in the space between the inlet means, e.g. nozzles, for the incoming air and the drum circumference is conducted separately and independently from the air flow of the air within the drum interior. The exhaust means, e.g. a fan, for evacuating the air from the drier space, are preferably arranged so that the air flows outside and within the drum are unidirectional. A common exhaust means for both air flows referred to may be provided, in which case the two flows are kept separately until they enter the exhaust conduit proper. It is also possible to provide separate exhaust means on one or both sides of the drier.

The air pressure within the drum will, of course, be much lower than in the space surrounding the drum, particularly if the material to be dried is not fully air permeable. In order to attain proper functioning and drying effect, it is therefore desirable to adjust at will the pressure difference between the two spaces. The invention, for this reason, provides for control means cooperating with the drum walls for adjusting this pressure difference at will, whereby due to the resulting interplay of the two air pressures, any desired drying effect may be obtained.

The inventive air flow arrangement is particularly advantageously employed in multi-drum driers, wherein the drums are placed parallel to each other in or staggered relationship. The interplay of the air pressures referred to is conducive to facilitate a controlled advance of the web through the drier, as will be apparent from the embodiments described below.

Referring now to the drawings and in particular to FIG. 1, reference numeral 4 indicates the perforated wall of a sieve drum rotatably mounted within a casing 90. The material to be dried (not shown) is normally supported by the drum wall 4. Air is introduced into the casing through nozzles or the like (not shown) and impinges with great force on the material on the drum. The flow direction of the incoming air is indicated by the arrows A. Depending on the permeability of the material, the air will either partly penetrate the material and pass through the perforations in the drum wall to gain access to the interior of the drum, or it will strike the surface of the material and be repelled by it in wave formation.

Exhaust means, e.g. a fan (not shown), are provided at the right-hand discharge end 2 of the casing and the drum, so that the air, whether within the drum interior or in the space between the drum surface and the casing wall, will be drawn towards the discharge 2 as indicated by the arrows B, the two air flows being substantially unidirectional. If the air penetrates the material, its flow will substantially correspond to the lines 3, while the repelled air will flow as indicated by lines 1.

The drum 4 has a neck portion 5 which leads to the discharge end 2 of the casing. It will thus be readily realized that the air flow 1 outside the drum is effectively separated from the air flow 3 within the drum, as the neck portion 5 prevents co-mingling of the two flows. It will be noted that the casing 6 has a contracted part, the curvature of which is substantially parallel to that of the neck portion, a feature which is conducive to an even air flow 1.

Obviously, the path of the flowing air outside the drum may be designed in different ways, e.g., the air may flow through an annular space, or several air channels may be provided.

It is also feasible to use separate fans for the exhaust of air from within the drum on the one hand and from the space between the casing and drum surface on the other.

As previously mentioned, the air is preferably admitted into the casing through nozzles (see FIGS. 18–20 to be discussed below). There, nozzles may be arranged in rows or groups transversely to the direction of the drum or they may be arranged radially or in any other desired formation dependent on whether the amount of air to be conducted over the material to be dried is to be uniform or varying at different locations. Thus, if the drying effect is to be greater in, e.g., the marginal portions of the material than at the center region, the nozzle grouping and inclination will obviously be different as if the opposite result is desired.

The invention also provides for means for adjusting the pressure difference between the drum interior and the space between the casing wall and the drum surface. One embodiment of such adjusting means is illustrated in FIG. 2. It will be seen that the drying arrangement of FIG. 2 comprises two drums 40 and 42.

Each drum cooperates with an outer adjusting means in the form of a cover member 2a and an inner adjusting means 1b. The outer cover members 2a are shown in section and have a curvature as an arc of a circle, corresponding to the curvature of the drum. Flange portions 13 prevent direct contact between the cover members 2a and the drums. It will be noted that the cover member of the left-hand drum cooperates with the upper portion of the drum while the cover member of the right-hand drum cooperates with the lower portion.

The cover members are raised and lowered relative to the drum surface by any suitable means, e.g., hydraulic, mechanical, pneumatical etc. generally indicated by reference numeral 80. These means may be fully or semi-automatic. In the lowered position (see the left-hand drum) the cover member overlies an appreciable portion 1a of the perforated drum surface, thus reducing the amount of air entering the drum interior, while in the raised position the air may freely enter through the drum perforations.

In operation the cover members 2a are raised or lowered when the material has been advanced onto the respective drum. The position of the cover members 2a will be adjusted in accordance with the pressure desired within the drums.

The inner cover members 1b bear against the drum surface from the inside and are adjustable relative thereto by rotatably mounted bracket members 38. Depending on the angular position of the inner cover members relative to the drum surface, the suction within the drum and thus the advance of the material to be dried may be controlled within wide limits.

The automatic actuation of the cover members 1b and/or 2a may also be controlled by a vacuum-responsive device or an aerometer which is triggered when a predetermined underpressure value has been reached so as to move the cover members accordingly.

FIG. 3 illustrates a different design for an outer cover member which comprises two halves 2b which are movable between a covering position indicated in broken lines and a raised position shown in full lines. The actuating mechanism for this type of cover member is generally indicated by reference numeral 81.

FIG. 4 illustrates a three-drum drier arrangement comprising the perforated drums 1c, 2c and 3c.

The material 25 to be dried is advanced towards the drier by a roller conveyor generally indicated at 37. The leading edge of the material 25 then contacts the rotating perforated drum 1c and the web material is thus advanced over the three drums as indicated in FIG. 4. Air impinges all the time on the outer surface of the travelling web while the suction within the drums is adjusted at will in order to advance and dry the web.

In order to accomplish satisfactory performance, each drum has interiorly located cover plates 4, 5 and 6 which have flange portions bearing against the drum walls. Each cover plate has a flap 4a, 5a and 6a, respectively, which may be opened or closed in accordance with the fluid permeability characteristics of the materials being treated. As indicated, the flaps 4a and 5a are shown open, the position in which they would be set when the material is somewhat fluid permeable. This permits air flow through the materials and perforations to the interior of the drum. The cover plates are stationary relative to the rotating drums but are angularly adjustable relative to the drum circumference. When the web material 25 shown in FIG. 4 is impermeable to air so that the air impinging on the material cannot penetrate to the drum interior, the cover plates 4, 5, and 6 are either opened or closed as indicated by the flaps 4a, 5a and 6a. The flap 6a is shown in a position closing plate 6 and with its flap 6a closed as shown in drum 3c, no appreciable amount of outside air can enter the drum 3c.

However, as the cover plates 4 and 5 with their flaps open are positioned below the travelling web portions, nothing prevents air from entering the interior of drums 1c and 2c as shown by the arrows in FIG. 4. It will thus be realized that by properly positioning the cover plates, an interplay of vacuum and air flow is accomplished, whereby any desired drying effect may be obtained. Drum 3c of FIG. 4 shows the position, wherein one portion of the drum surface is blocked by the impermeable material 25, while most of the remaining surface is blocked by the closed cover plate 6.

Thus, under-pressure prevails in this drum, which causes suction of the material towards the drum, whereby it is readily advanced by the rotating drum. In other words, the interplay of adjustable vacuum and moving air also facilitates the travel of the web through the drier.

The flaps may be designed so as automatically to open when a certain vacuum value has been reached. Or, suitable means may be provided for operating the flaps at will.

Figure 6:
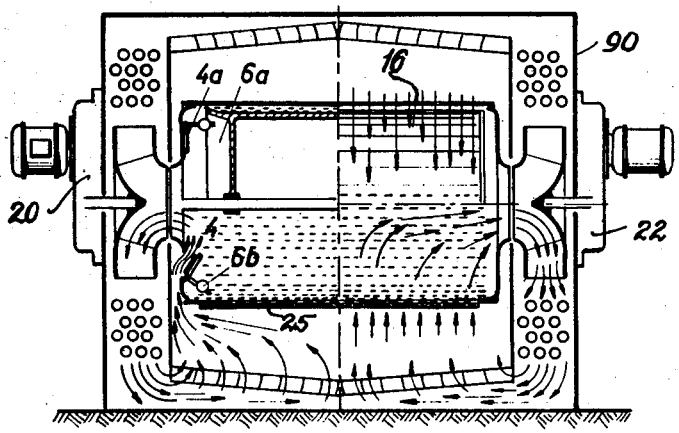
FIG. 6 is a composite sectional view, the left-hand half of the figure being a section along line 6—6 of FIG. 5, while the right-hand half is a section along line 6'—6' of FIG. 5.

FIGS. 5 and 6 illustrate an embodiment which is designed to accomplish the desired coaction and interplay of air flow outside and within the drum automatically in dependence on the pressure within the drum, thus eliminating complicated and expensive adjusting mechanisms.

The arrangement comprises three rotatable drums 1d, 2d and 3d positioned in the same manner as in FIG. 4. Drums 2d and 3d are provided with interconnected plate members 15 and 16, respectively, arranged in the manner of louvers or venetian blinds.

The interconnected plate members are normally closed and movable into an open position in response to one or several control weights which in turn are responsive to underpressure. In the embodiment illustrated, the weight opens the plates at an under-pressure of 50–60 mm. water column.

Of course, other values may be chosen. Thus, if material 25 is to be dried which permits the passage of air into the interior of the drums, the pressure within the drum will normally readily drop below the indicated value so that the plates will not be actuated.

The same holds true if impermeable piece goods are to be dried and the spaces between the various pieces are sufficiently large so as to permit ready entry of air into the drum interior and an air flow therein at a pressure of below 50–60 mm. water column. However, if impermeable webs or closely spaced piece gods are dried, so that but little or none of the ambient air enters the drum, the under-pressure in the drum would increase until the plates are automatically opened, thus permitting the exhaust of air from the adjacent drum.

In order to be able to utilize the exhaust air for the drying process, that is, in order to avoid direct intake of the circulated air, the cover plate 16 of drum 2d is arranged at the outer circumference of that drum. The possibility of providing or omitting the nozzles 8a (see drum 1d) is still given. If impermeable material is dried in endless webs, which extend over the entire perforation width of the drums, that is, their working width, the total amount of intake air of the drum 2d is exhausted after charging the drums 1d and 3d. The resulting air current thus extends in or opposite to the feed direction.

If it is desired to produce an exhaust current or flow transversely to the feed direction, the air must be exhausted by the same drum to which it has been admitted. This is made possible by the flaps 4a on the end face of the drum 1d. If the drum bottom is rigidly connected with the drum jacket, so that the drum bottom also rotates during the advance of the material to be dried, the flaps 4a must be loaded, depending on their position, in order to permit opening of the suction plate only in the vicinity of the material, and only when the necessary under-pressure has been attained.

Figure 7:
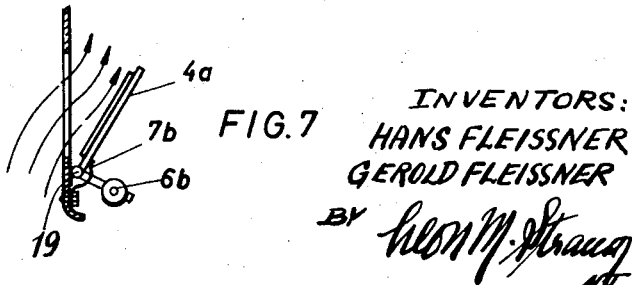
FIG. 7 shows a detail of FIG. 6 on enlarged scale.

FIG. 7 shows a flap 4a as described above in side elevation. The flap is spring loaded, as indicated at 19. The load is adjusted so that it only yields at a certain under-pressure and thus permits opening of the flap. An additional weight load 6b and spring 7b, permit opening of the flap only in a predetermined position, that is, when the direction of movement of the flap coincides with that of the material to be dried. The weight-and spring load, respectively, may be controlled by other control mechanisms, such as cams, which operate in dependence on and in response to an under-pressure measuring instrument.

The composite view of FIG. 6 clearly indicates the air flow by the arrows. This view also illustrates the general arrangement of the device including exhaust fans 20 and 22 at the discharge ends of the casing 90, to be described in greater detail in connection with the following embodiments.

The embodiment of FIGS. 5 and 6 is not only applicable to sieve drum driers, because the application of the inventive air flow arrangement may also be utilized in, for example, band cylinder or roller driers. Moreover, the inventive air flow can also successfully be applied, for example, in wet treatment bath arrangements or in sieve drums which are traversed by other media.

Another embodiment of the inventive arrangement is shown in FIGS. 8 to 12.

FIG. 8 shows a section through a sieve drum 12 rotatably mounted in casing 90. As indicated by the arrows, air is deflected by a guide tube or nozzle 11 towards the perforated drum bottom of the sieve drum 12. If completely impermeable material is dried on the drum, the air enters the drum through the aperture 13 in the drum bottom, as indicated by the arrow C (see also FIG. 9).

A baffle plate 15 as shown in FIG. 9 may be provided, so that the air is subject to additional deflection, e.g. in a direction perpendicular to the drum. FIG. 9 also shows the material 14 to be dried.

Figure 10:
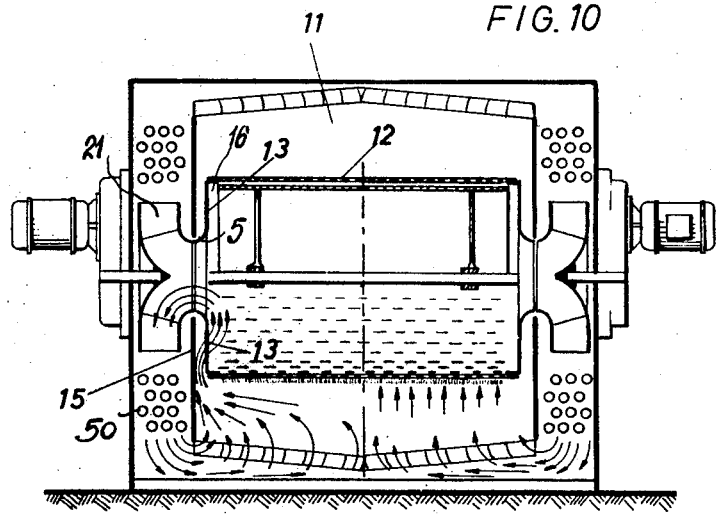
FIG. 10 shows a still further embodiment of a sieve drum drier similar to that of FIG. 8.

FIG. 10 shows an embodiment similar to that of FIG. 8. This figure illustrates the path of the air flow in the case of but slightly permeable material. Lateral apertures 13 are provided on one side of the drum bottom only.

It will be seen, as indicated by the arrows, that the impinging air emanating from the nozzles 50 is repelled by the material and deflected by the deflecting plate 15 towards the left-hand end face of the drum where the air enters through openings 13. The air leaves the drum through the neck portion 5 and may be recycled, if desired.

Figure 11:
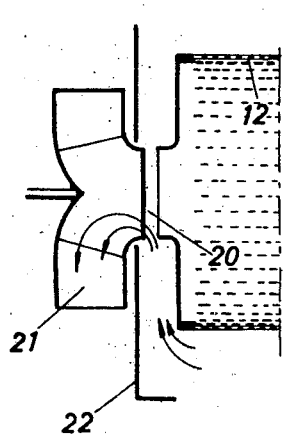
FIG. 11 is a detail view of a modification of the embodiment of FIG. 10.

FIG. 11 is a modification of FIG. 10 and provides an air gap 20 between the fan 21 and the drum. The air to be exhausted is additionally deflected in the desired direction by a cover plate 22.

Figure 12:
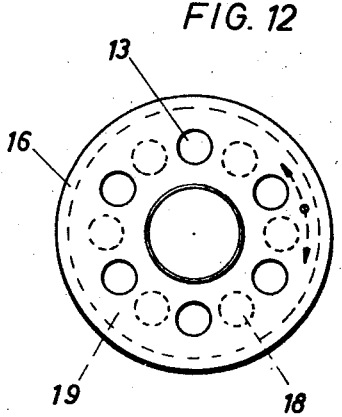
FIG. 12 is a detail view of an element of the embodiment of FIG. 10.

FIG. 12 shows a means for blocking the apertures 13 of FIGS. 8–10. For this purpose a rotatable disk 19 is mounted adjacent and parallel to the lateral drum wall 16 in which the apertures 13 are provided.

The disk 18 has openings of the same size as the apertures 13. When the disk is rotated so that the openings and apertures 13 and 18, respectively, are in register, air can readily flow therethrough. However, by rotating disk 19 out of register, the apertures 13 will be blocked. Of course, partial blockage of apertures 13 may be accomplished by this means.

In order to increase the suction effect still further, the suction pipe leading from the drum to the fan may be made much larger, for example, its diameter may be almost as large as that of the drum. The gap 20 of FIG. 11 is thus displaced in the direction towards the drum jacket.

The width of the gap 20 may be adjustable, depending on the requirements.

Obviously, a combination of all these measures is feasible. In other words, both gaps and apertures may be provided.

According to the embodiment of FIGS. 13–17, the material 25 to be treated, which in the present case is a web or fleece of threads or grouping of threads, is advanced along a conveyor having guide rollers and holding means generally indicated by reference numerals 2' and 1'.

The drier proper is thus interposed between two conveyor sections. When a length of web corresponding to the path through the drier has been advanced, the end of this web length is fastened as by sewing or vulcanization. During the treatment time of this web length within the drier, a new supply is held in preparedness adjacent the holding means 2', so that substantially continuous operation is feasible.

Applicants have successfully performed experiments with the embodiment of FIGS. 13–17 by drying a web composed of threads of a width of 1.6 meters. The traction force of the holding means was relatively small, i.e., approximately 100 kgs. However, it may be considerably higher, e.g. several 1000 kgs.

The fan 31 in this embodiment exhausts from the interior of the drum 23 only about half of the amount 24 of air 25a supplied to the drier through the nozzles 30 (see FIG. 14), while the other half of the air 25a flows directly over the circumference of the drum to the fan 31. The fan 31 in this embodiment is not secured directly to the drum, but a gap 26 between fan and drum permits direct intake of the air 25 surrounding the circumference of the drum, while a gap 27 between the drum bottom and the casing wall 90 is provided so that the air entering through the nozzles flows through the gap 27 into the interior of the drum.

The air is conducted over heating elements 25h and fed to the nozzles. A continuous ceiling 28 extending between opposite casing walls below the drum sectors which are not surrounded with the material to be dried prevents the air from flowing unused directly over the gaps 26 and 27 to the fan. The ceiling 28 forms a barrier, so that the air must pass through the nozzles 30. The nozzles may have any desired form.

The drum wall 29 (see FIG. 14) may have as many apertures as required or suitable. Means may be provided for blocking the apertures as described in connection with FIG. 12.

FIG. 15 represents a section 15—15 of FIG. 14.

FIG. 16 schematically indicates the air flow in this embodiment. It will be seen how the air emanating from the nozzles is divided into the flows 24 and 25a as indicated by the arrows. The gap 26 is shown between the drum 23 and the fan 31. Two air passageways 32/33 of equal size are indicated.

Supporting means 34 are mounted on the drum circumference as shown in FIG. 17. These supporting means 34 prevent direct contact between drum and web. The distance 35 between web and drum may be enlarged by constructing the drum circumference between two adjacent supporting means 34 as a straight surface. Thus a drum of polygonal cross-section would be obtained; or the convex curvature of the drum may be made concave instead.

As pointed out, the embodiment of FIGS. 13-17 is particularly suitable for the drying of groups of threads. The material is pulled through the drier by a holding mechanism 1' at the discharge end of the drier, each drum being put in rotation by the frictional force of the material to be dried. The drums in this embodiment thus have no separate or own drives, although drums with own individual and regulatable drives are to be considered to be encompassed by this invention. The circumferential speed of the drum adapts itself to the pull speed of the threads or web, which undergo elongation due to the tension and crimping at certain locations and shrinkage at other predetermined locations due to drying.

The material to be dried may be impregnated, for example, in a latex bath. This, however, renders the material sticky, so that direct contact with the drum jacket must be prevented.

For this reason the supporting means 34, for example, in the form of metallic or nonmetallic pipes or rods are provided on each drum jacket. The exhausted air passes thus either over the drum jacket in the direction of the fan or flows to the fan through the interior of the drum. The supporting means are arranged at a distance from each other and may be radially displaced. For many purposes a distance of 200 to 300 millimeters is sufficient; but, of course, other distances may be chosen. It is, however, important to obtain a point contact between the supports and the web. The supporting means should therefore be narrow and rounded off at the contact points.

As profiles, round, oval, triangular, rectangular or polygonal cross sections may be used. The material is tightly stretched between the individual supports so that it does not bear on the drum surface.

The cross section of the drum need not be circular. A polygonal form or an inwardly curved form (concave) is also feasible. Such latter cross sectional form of the drum prevents contact of the material even if the distance of the supporting means is relatively great.

In order to permit the air to flow off laterally, air baffles may be provided. But if intensive irradiation of the threads with the reflected drying medium is to be achieved, the drum surface should be shaped accordingly, e.g., it may be corrugated.

It is also possible to use perforated drums wherein the size of the perforations varies in accordance with the different air permeability of the various materials.

Above the drum sectors supporting the material concentrically arranged nozzle boxes are provided which may be so staggered, that each point of the drum is subjected during the drum rotation to the air flow emanating from nozzles. Air is uniformly admitted through the nozzles. Preferably the air passes over the groups of threads in radial direction and strikes with great energy against the drum jacket.

The nozzles extend thus preferably radially over the drum jacket. The nozzle cross section is usually circular. Any other cross sectional form is, however, feasible, e.g., oval or rectangular. In order to obtain the above-mentioned air flow, the nozzles may be staggered, but a parallel arrangement is also possible. Means for adjusting the nozzles with regard to their distance from the drum jacket and from each other are advantageously provided.

The cross section of the nozzles may be greatest in the center of the jacket. Towards the edge, the nozzle outlet cross section then becomes smaller.

In this way the amount of air can be regulated. Under certain circumstances a more intense drying in the center may be desirable, because larger amounts of air flow in any event to the marginal zones of the material.

The air flowing over the drum jacket is sucked in by the fan; for this reason an air gap is preferably provided between the side wall of the drum and the fan; the size of the air gap may be regulated by an adjustable arrangement of the fans. In a similar manner it is possible to regulate the distance between the other side wall of the drum and the drier case. It may be of advantage if the drier case is curved in this region.

FIG. 18 is an elevation of an air nozzle 30 which may be used in the various embodiments presented hereintofore, while FIG. 19 shows an example of a nozzle grouping as referred to above. FIG. 20 is a sector on line 20—20 of FIG. 19 and shows five mounted nozzles in elevation.

From the above description it will have become apparent that two separate air flows are provided within the drier which are adjustable relative to each other. If, for example, the suction within the drum space becomes too strong with resulting increased under-pressure, the suction may be deflected towards the air inlet means by the cover means and adjustable openings disclosed, until the desired pressure equilibrium has been attained again.

Further, the air flow may be throttled and/or deflected by the provision of deflecting plates (see, e.g. FIG. 9) and by properly shaping the contours of drum and casing (see, e.g. FIG. 1). This throttling or deflection also produces an under-pressure in one of the air conduits.

The invention is applicable to drum driers wherein the drums are positively rotated by separate drives as shown in most of the embodiments, and to driers wherein the drums are rotated by the frictional force of the material which is pulled outside the discharge end of the drier as shown in FIGS. 13-17.

The air ducts conducting the air flows may be divided into several groups which merge in the vicinity of the exhaust means. The ducts may extend up to the nozzles or they can be made shorter. It suffices if they extend at least in the flow direction of the nozzle air.

As previously mentioned, it is also conceivable that the suction in the interior of the drum is produced by another fan than the suction for exhausting the air outside the drum.

In the embodiments of FIGS. 2-7, connectable and disconnectable covering means are disclosed which are arranged in the transition zone between the two air flows.

These covering means, as shown, may be arranged outside or inside the drums and/or on the side. They comprise liftable, slidable or hinged cover members which may be actuated in any desired manner.

The cover members are opened or lifted simultaneously or progressively, after the introduction of the web material into the drier.

At least one cover plate may be arranged movably relative to the sieve drum jacket (or sieve drum bottom), the movement of the plate being effected by mechanical, hydraulic, pneumatic or electrical means. The control impulses may also be transmitted by a pressure responsive device. The control of the covering means is then effected directly or indirectly in response to the underpressure in the interior of the drum.

As known, the air velocity is a factor of the pressure gradient, i.e., of the pressure differential between the two flows. When air blows through the automatically opening covers, the air velocity is thus determined by the pressure difference outside and inside the drum. Since the resistance of the automatically opening covers increases quadratically, when the velocity of the sucked-in air is increased, the automatically opening covers release a larger or smaller gap for the flowing air, depending on the air velocity and the pressure difference.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A fluid treatment device such as a device for drying web material, comprising a casing, a drum having an open end defining a fluid discharge and being rotatably mounted in said casing and having a perforated cylindrical drum surface adapted to support a web to be treated, said casing having a wall portion extending around said drum at a spaced location from the outer periphery of said drum, means for directing fluid against said drum and the material thereon along the entire length of said drum and for producing a suction within said drum by withdrawal of the fluid from one end of said drum, said casing extending outwardly at a spaced location from said drum at the discharge end thereof to define a passage from the periphery of said drum to said discharge end and defining at least one air discharge opening in communication with the interior of said drum, said drum and said casing defining therebetween a first fluid flow path extending along the passage from the periphery of said drum to said fluid discharge opening, the space within said drum and said fluid discharge opening defining a second fluid flow path, adjustably arrangeable baffle means interiorly and exteriorly of said drum for effecting the holding of the materials on the periphery of said drum by permitting drying fluid flow through said material and through said drum when said material is fluid permeable and also for effecting the holding of material on said drum when said material is not fluid permeable by permitting flow toward said material and then inwards along the drum for discharge through said discharge opening, and exhaust means adjacent said discharge opening for evacuating air flow from within said casing through said first and second air flow paths.

2. A fluid treatment device according to claim 1, wherein said adjustably arrangeable means includes baffle means cooperating with said drum for adjusting the fluid pressure differential between said first fluid flow path to said second fluid flow path.

3. A fluid treatment device according to claim 1, wherein said first and second fluid flow paths extend substantially parallel and unidirectionally.

4. A fluid treatment device according to claim 1, wherein said adjustably arrangeable baffle means comprises a cover movably mounted within said casing, said cover portion being movable between a position covering and a position uncovering some of the perforations of said drum.

5. A fluid treatment device according to claim 1, wherein said baffle means includes a curved plate bearing from the inside against a portion of the drum surface, and a mounting element for mounting said plate within said drum for angular adjustment relative to the drum's circumference.

References Cited in the file of this patent

UNITED STATES PATENTS

| | | |
|---|---|---|
| 235,937 | Delharpe | Dec. 28, 1880 |
| 2,532,910 | Hayward | Dec. 5, 1950 |
| 2,578,633 | Mauffre | Dec. 11, 1951 |
| 2,879,607 | Fleissner | Mar. 31, 1959 |

FOREIGN PATENTS

| | | |
|---|---|---|
| 336,540 | Great Britain | Oct. 16, 1930 |
| 1,186,696 | France | Feb. 23, 1959 |